United States Patent Office 2,806,724
Patented Sept. 17, 1957

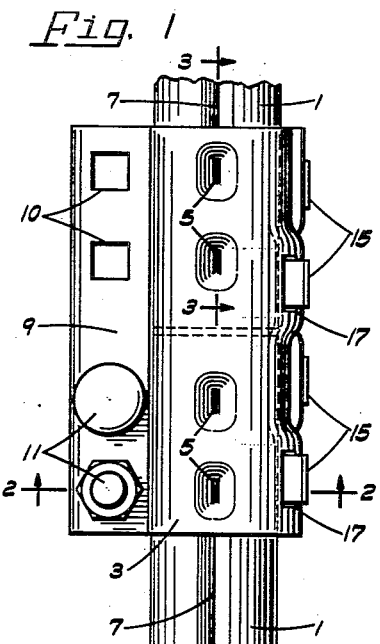
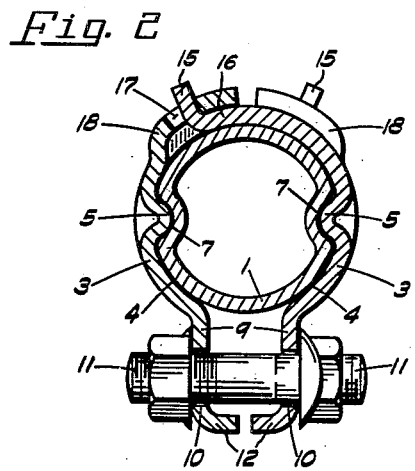
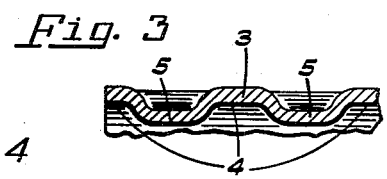
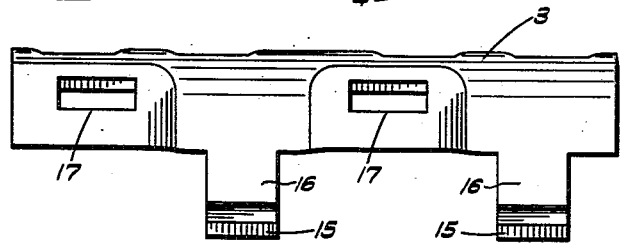
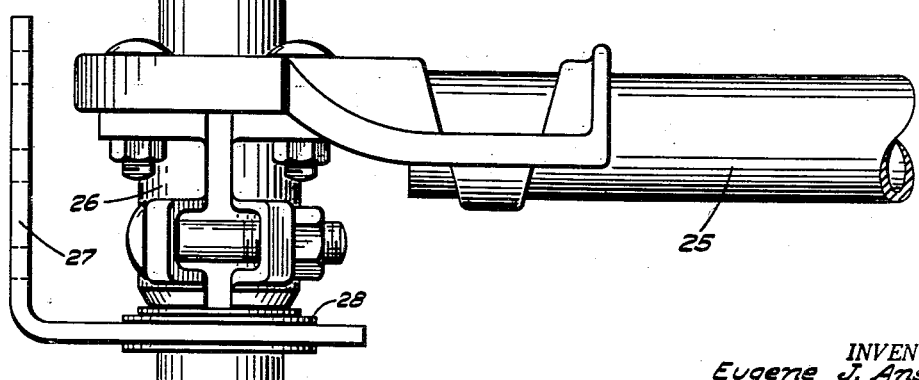
INVENTORS.
Eugene J. Anspach
Walter Kowalski
BY Ralph G. Hohenfeldt
Attorney

2,806,724
COUPLING CLAMP

Eugene J. Anspach, Milwaukee, and Walter Kowalski, South Milwaukee, Wis., assignors to McGraw-Edison Company, a corporation of Delaware Application December 6, 1954, Serial No. 473,393

3 Claims. (Cl. 287—118)

This invention relates to a clamp for engaging a cylindrical member or for mechanically coupling a pair of cylindrical members such as shafts or pipes in rigid endwise relationship.

The invention is particularly applicable to electric substations where a group of simultaneously operated disconnect switches are located high upon a metallic structure for operation through suitable intermediate mechanism from a remote station near ground level. In such cases a tubular shaft in the form of a pipe is connected to the switch mechanism above to a manual operating lever or mechanical drive means below so that torque supplied to the shaft accomplishes opening and closing of the switches.

Frequently, the switch operating pipe shaft is too long to be made in a single convenient length so it is the practice among suppliers of switching equipment to provide pipes in standard lengths and one fractional length so that the desired overall length may be made up. This means that the individual pieces of pipe must be coupled together at the site of installation, an operation which is facilitated by this invention. In addition, it is occasionally necessary that one of the pipe sections be sawed off in the field for the purpose of attaining a desired overall length. Upon this event, where prior art couplings are used, it is the practice to drill through the coupling and each abutting end of the pipes and to insert a bolt or other dowel means to assure that the coupling would not slip with respect to the pipes while transmitting a torsional force from one pipe section to another.

Those versed in the art will recognize as an obvious disadvantage the need for drilling through the pipe wall because it weakens the pipe torsionally and because of the inconvenience accompanying drilling of holes with equipment that requires more manual effort to operate than is ordinarily required for machinery back in the fabricating shop. Aside from the reasons enumerated it is also desirable to avoid drilling and cutting of the pipe because it punctures the galvanizing metal with which most substation components are coated during manufacture, thus increasing the likelihood of corrosion.

This invention facilitates coupling of pipe shafts in the field, overcomes the above noted disadvantages and has among its objects the following: to provide a coupling which positively connects adjacent shaft ends without use of set screws, through-bolts or welding and without requiring on-the-job drilling; to provide a coupling capable of positively transmitting high torque although it has proportionately small metal content; to enhance positive gripping of the coupled shafts by means of built-in shaft engaging lugs; and, the very important object of making the two mating halves of the coupling identical and interchangeable so that assembly is facilitated and considerable economy may be effected in manufacturing the forming and piercing dies, only a single set being required for both halves. A general object is to provide a more useful and efficient coupling. More specific objects will appear from time to time hereinafter.

In general terms, the invention comprises a coupling which may be made in two identical pieces. Each piece includes a substantially semi-circular clamping body which is adapted to lie snugly in frictional engagement with the coupled shafts. One or more lugs protrude radially inward from the interior surface of the body portion for positive engagement with a longitudinal groove in the pipe shafts which the coupling joins. Thus, friction alone is not relied upon to transmit torque but positive connection is made by the lugs registering with a groove in the pipe.

To avoid the need for slipping the coupling over the end of a pipe when positioning or removing it, the separate pieces of the coupling are adapted to interlockingly hinge on each other so that they may be swung open. Integral flanges project radially from the coupling body for receiving clamping bolts which urge the halves together and firmly seat the coupling lugs in the pipe grooves.

A detailed description of the invention will now be made in conjunction with the drawing in which:

Fig. 1 shows a plan view of the coupling clamp assembly, with some of the bolts omitted, and applied to separate pipe sections, one of which carries a manual operating handle;

Fig. 2 is a sectional view taken on the line 2—2 of Fig. 1;

Fig. 3 is a partial sectional view, with the pipe omitted, taken on the line 3—3 of Fig. 1, illustrating the configuration of the groove engaging lugs; and Fig. 4 represents a top view showing the hinge tongues and slots of the clamp, in detail.

By reference to Fig. 1 it will be seen how the novel coupling is used to rigidly join a pair of tubular pipe shafts 1 in aligned endwise relationship. Bearing in mind that the opposed mating halves of the coupling are identical, reference may be made to Fig. 2 which more clearly discloses their mode of cooperation. Numeral 3 designates the arcuate body portion of the clamp which on its internal face 4 follows the contour of pipe 1 in snug frictional engagement. Embossed radially inwardly from body 3 are a plurality of spaced lugs 5 which protrude into registry with a longitudinally disposed groove 7 pressed into the periphery of the pipes 1. The conformation of the lug is best seen in Fig. 3. It is preferable to make lugs 5 just a little longer radially than the depth of groove 7 so that when the coupling is tightened on the pipes the lug 5 will be forced into very intimate contact with every crevice of the groove 7. By keying the clamp to the pipe in this manner, very excellent torque transmitting characteristics result.

A bolt flange 9 extends outwardly from one margin of clamp body 3 and is provided with a series of square holes 10 for receiving galvanized carriage bolts 11. Since the halves of the coupling hinge on each other in a manner more fully described hereinafter, tightening of the carriage bolts 11 forces the lugs 5 in groove 7 as described. The remote edge of flange 9 is bent at a right angle to form a coextensive lip 12 which strengthens the flange and may serve to act as a limiting stop when the assembly is tightened excessively as is evident from Fig. 2.

Since each half of the coupling is identical, merely turning one half endwise with respect to the other and interlocking them is all that is necessary to form the coupling assembly.

Figs. 2 and 4 of the drawing show a plurality of tongues 16 projecting from the margin of the clamp body 3 opposite flange 9 and following the curvature of the body 3. The tongues 16 terminate in hook-like portions 15 for a reason which will be evident shortly. Immediately adjacent the tongues 16 are slots 17 having dimensions closely corresponding with the cross sectional dimensions of the tongues. These slots 17 are set back from the margin of the clamp and disposed in an offset portion 18 thereof which forms a recess allowing the tongue 16 to pass under offset 18 while the tongue bears directly on the pipe 1 as in the assembly of Fig. 2. The hook-like ends 15 of the tongues 16 extend through the slots 17 and form a hinge joint therewith which can only be pivoted when the carriage bolts 11 are loosened or removed. This feature enables placing the coupling right on a joint without sliding it over the pipe end. Note especially in Fig. 4 that pairs of tongues 16 and slots 17 are spaced equidistantly from each other so that when the corresponding halves of the coupling are interlocked their ends coincide and present an even edge around the coupling.

Use of the described coupling and grooved pipe in conjunction with a manual operating handle 25 such as shown in Fig. 1 completely avoids having to cut pipe or drill holes therein when assembling a switch operating shaft on the job, thereby maintaining the integrity of the galvanizing coating on all parts, a fact which could not be accomplished with prior art devices. This is so because operating handle 25 is carried by a split clamp 26 thrusted on a bearing 28 which is in turn supported on a bracket 27 in such manner that pipe 1 itself extends straight through the bearing 28. Consequently, if galvanized pipe 1 is a little long when shipped it need not be cut in the field, rather, the pipe need only extend a little farther through bearing 26 as shown. Hence, bracket 27 may be anchored in a position corresponding with the exact height of the handle 25 desired by the customer regardless of whether the operated group of switches is a little above or below its predetermined height.

For the sake of completeness it may be noted that pipe 1 is usually standard iron pipe and the coupling clamp itself is preferably made of mild steel, although any metal which lends itself to progressive forming operation may be used for the latter.

Summarily, a novel coupling clamp has been described, in considerable detail, which efficiently transmits force for operating a switch and which facilitates assembling of the operating pipe shaft unit at the place of installation without cutting the pipe, or impairing the galvanizing by set screws biting into the pipe and without drilling holes on the job. The scope of the invention is to be limited only by the claims which follow.

It is claimed:

1. A clamping member adapted to cooperate with an identical member for engaging a cylindrical member comprising, an arcuate cylinder embracing body having a lug protruding radially inwardly therefrom, a bolt receiving flange extending radially from one margin of said body, a tongue projecting circumferentially from the opposite margin and having the radius of curvature of said body, said body having a portion offset to a greater radius than said body adjacent said opposite margin and said offset portion having a tongue receiving aperture therein longitudinally spaced from said tongue, the offset portion of an endwise oppositely disposed clamping member overlaying the tongue of a cooperating identical member when in clamping relation on a cylindrical member.

2. A clamp for coupling two longitudinally externally grooved cylindrical members in end to end relationship comprising, a pair of identical clamping members each having an arcuate body conforming with the periphery of the cylinders to be coupled and having a plurality of lugs protruding radially inwardly for reception by a groove, a bolt receiving flange extending radially from one margin of said body, a plurality of tongues projecting circumferentially from the opposite margin of said body and having outwardly hooked ends, said body having offset portions of greater radius of curvature than said body adjacent said opposite margin, said offset portions each having a tongue receiving aperture therein longitudinally spaced from a tongue, whereby the hooked ends of the tongues on one clamping member may hingedly engage the apertures on an endwise opposed identical member with the offset portions overlaying cooperating tongues.

3. A clamp for engaging a cylindrical member comprising two substantially identical mating clamping members arranged in endwise opposed relation with each other, each member including an arcuate cylinder embracing body, a bolt receiving flange extending radially from one margin of said body, a plurality of tongues projecting circumferentially from the opposite margin of said body, said opposite margin having apertures adjacent thereof and equidistantly intermediate the tongues for registration with tongues of an opposite clamping member, the portions of said margin including said apertures being offset to a greater radius of curvature than said body for overlaying the tongues of a cooperating clamping member, whereby said tongues bear on a cylindrical member being clamped.

References Cited in the file of this patent

UNITED STATES PATENTS

| | | |
|---|---|---|
| 895,143 | Augensen | Aug. 4, 1908 |
| 1,151,914 | Weaver | Aug. 31, 1915 |
| 1,471,386 | Crockett | Oct. 23, 1923 |
| 1,638,230 | Alsaker | Aug. 9, 1927 |